T. ABTMEYER.
CULINARY APPARATUS.
APPLICATION FILED MAR. 13, 1911.
1,121,575.
Patented Dec. 15, 1914.
2 SHEETS—SHEET 1.
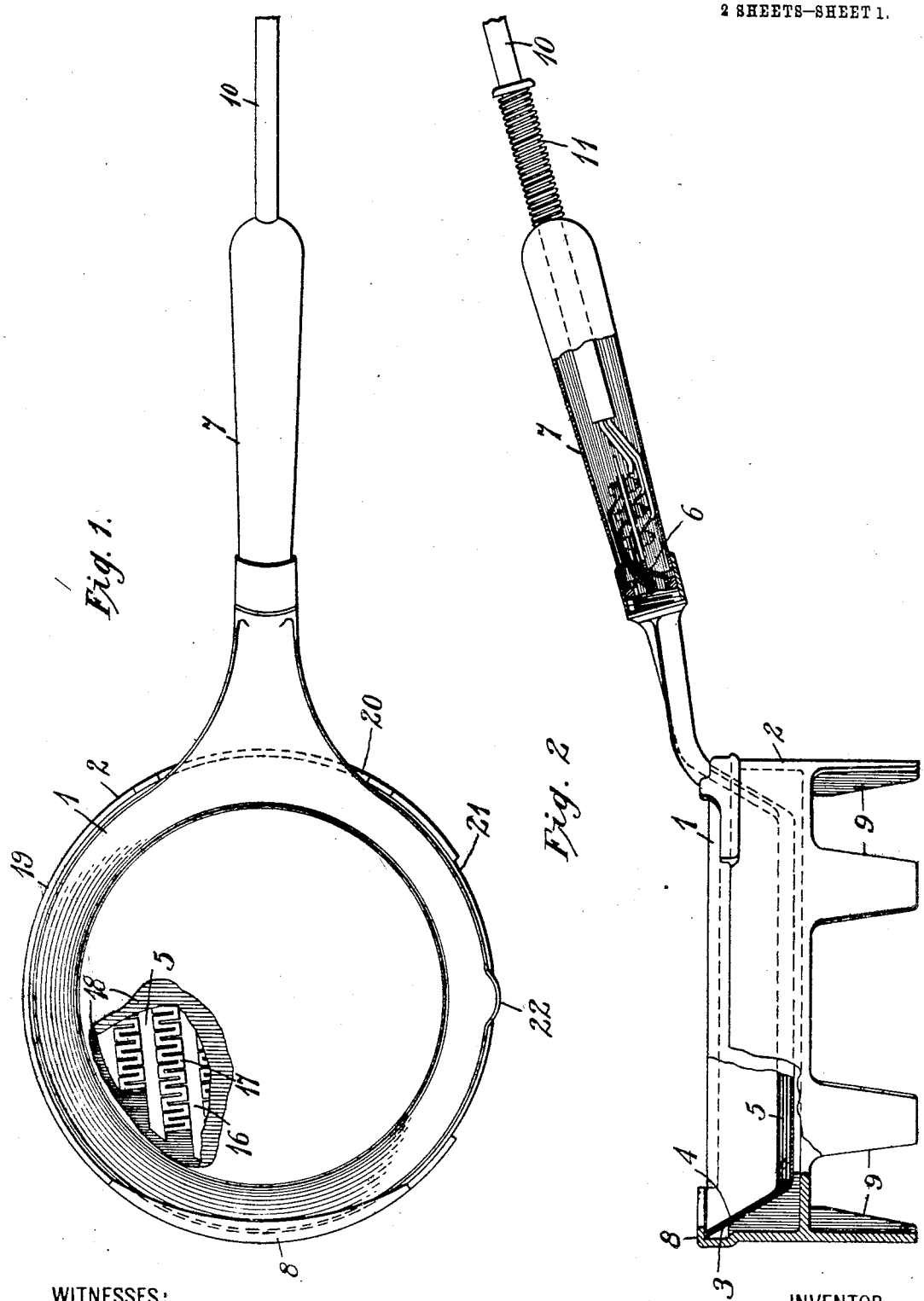
WITNESSES:
INVENTOR
Theodor Abtmeyer
BY
ATTORNEY

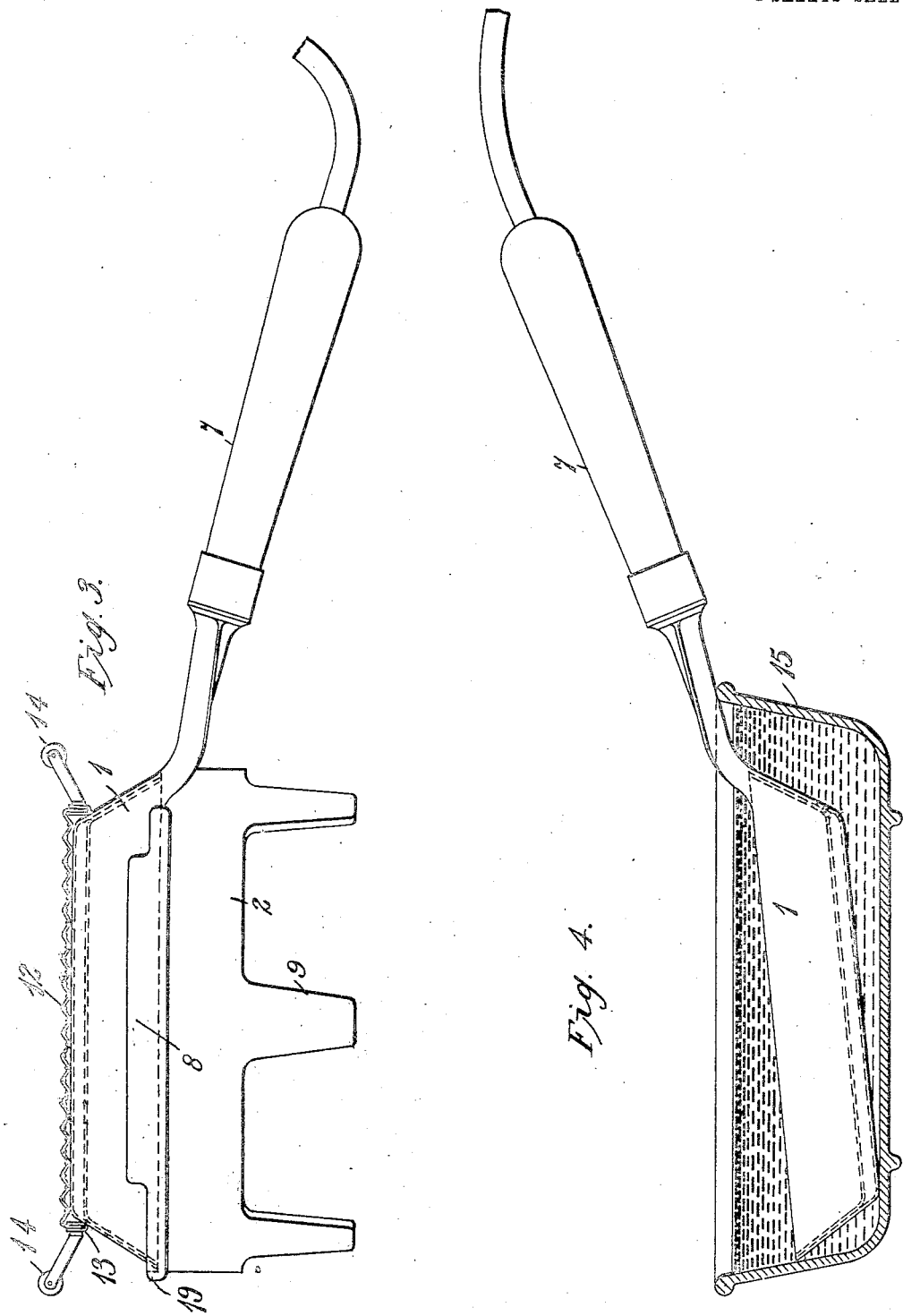

UNITED STATES PATENT OFFICE.

THEODORE ABTMEYER, OF WILKINSBURG, PENNSYLVANIA, ASSIGNOR TO WESTINGHOUSE ELECTRIC AND MANUFACTURING COMPANY, A CORPORATION OF PENNSYLVANIA.

CULINARY APPARATUS.

1,121,575.  Specification of Letters Patent.  Patented Dec. 15, 1914.

Application filed March 13, 1911. Serial No. 614,234.

*To all whom it may concern:*

Be it known that I, THEODORE ABTMEYER, a citizen of the United States, and a resident of Wilkinsburg, in the county of Allegheny and State of Pennsylvania, have invented a new and useful Improvement in Culinary Apparatus, of which the following is a specification.

My invention relates to culinary apparatus and particularly to electrically heated culinary devices.

The object of my invention is to provide a very simple and compact device of the above specified character that shall be practically indestructible and adapted to a diversity of uses.

In order to accomplish the aforesaid object to the best advantage, I prefer to utilize a resistance element in the form of a flat disk of insulation and an embedded flattened helix of resistance ribbon, although other resistance elements may be used, and a pair of sheet metal frying pans or pan shaped members of the same size nested together with the resistance element between them. The handles of the pans are combined to constitute a hollow projection through which the resistance leads extend. The two pans are then welded together at their edges to produce a compact water-tight structure which may be utilized in the ordinary manner as a frying pan, immersed in liquids as an immersion heater, or turned upside down on a specially constructed stand to constitute a cook-stove.

My electric heater has the advantage of having all its surfaces smooth and its resistance element sealed so that the pan can be plunged into hot water or washed and scrubbed like a frying pan of the ordinary type. Furthermore, it is specially advantageous for the use of druggists and chemists in boiling inflammable liquids such as turpentine and for heating purposes where an open flame or incandescent heating element would be very dangerous.

Figure 1 of the accompanying drawings is a plan view, with certain of the parts broken away to disclose the resistance element, of an electrically heated frying pan constructed in accordance with my invention. Fig. 2 is an elevation, partially in section, of the parts shown in Fig. 1, and Figs. 3 and 4 are elevations which respectively illustrate the use of the frying pan of Figs. 1 and 2 as a toaster-stove and as an immersion heater.

Referring to Figs. 1 and 2, the frying pan or vessel 1 here shown, is mounted on a stand 2 and comprises a pair of ordinary sheet metal frying pans or pan shaped members 3 and 4, of the same size, nested together, an interposed resistance element 5, a terminal structure 6 and a hollow handle 7. The resistance element 5 may be of any suitable form but is preferably flat and comprises a notched disk 16 of insulation on which a resistance ribbon 17 is wound in the form of a flattened helix, insulating disks 18 being placed on the respective sides of the disk 16 to separate the ribbon from the pans. The terminal structure 6 may be arranged in any suitable manner but preferably corresponds to that shown and described in a co-pending application, serial No. 568,871, filed June 25, 1910, by William S. Hadaway, Jr.

As shown in Fig. 2, the conducting leads are formed into a cable 10 and are threaded through a helical spring 11 which is attached to the handle 7 at its outer end in order to prevent the conductors from being bent sharply at the end of the handle and broken.

The stand 2 is provided with a flange 8 which is engaged by the edge of the pan or vessel 1 at a point opposite the handle and prevents the handle from overbalancing the body of the vessel when empty. The body of the stand is ring-shaped and a plurality of legs 9 project downwardly therefrom.

A flange 19, having notches 20 and 21, tends to center the pan particularly when supported in its inverted position as shown in Fig. 3, the notches 20 and 21 being adapted to receive the handle and the nose 22 of the pan.

Referring to Fig. 3 of the drawings, the pan or vessel 1 is inverted on the stand 2, the inclination and length of the handle 7 being such that it assists the stand in supporting the vessel with its bottom surface in a horizontal plane. A wire screen 12 stretched on a circular frame 13 having handles 14, is fitted upon the bottom of the vessel whenever it is desired to toast slices of bread or to do similar cooking. In Fig. 4 the heater is shown immersed in a body of liquid contained in a vessel 15.

I claim as my invention:

1. The combination with a frying pan having a handle, of an annular supporting stand having an upwardly projecting body portion provided with a notch at one side to receive the pan handle and with an overhanging flange at the opposite side to be engaged by the edge of the pan when in either normal or reversed position.

2. The combination with a pan or vessel comprising a unitary metal clad heating structure adapted to be utilized either in a usual or reversed position, of a stand therefor comprising a ring shaped body having supporting legs and a notched annular flange overhung inwardly at one side.

3. A stand for pan shaped heating apparatus comprising a ring shaped body having downwardly extending legs and an upwardly extending annular flange for centering the pan shaped heater, said flange being notched and provided with an overhanging portion to hold the heater in position.

In testimony whereof, I have hereunto subscribed my name this 28th day of Feb., 1911.

THEODORE ABTMEYER.

Witnesses.
ERNEST HARRIS,
B. B. HINES.